US009904402B2

(12) United States Patent
Chiu et al.

(10) Patent No.: US 9,904,402 B2
(45) Date of Patent: Feb. 27, 2018

(54) MOBILE TERMINAL AND METHOD FOR INPUT CONTROL

(71) Applicant: HON HAI PRECISION INDUSTRY CO., LTD., New Taipei (TW)

(72) Inventors: Liang-Te Chiu, New Taipei (TW); Chia-Hao Kang, New Taipei (TW); Hsin-Wei Huang, New Taipei (TW); Sheng-Feng Weng, New Taipei (TW); Bing-Ju Tu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 414 days.

(21) Appl. No.: 14/721,512

(22) Filed: May 26, 2015

(65) Prior Publication Data

US 2016/0188080 A1  Jun. 30, 2016

(30) Foreign Application Priority Data

Dec. 31, 2014  (TW) .............................. 103146682 A

(51) Int. Cl.
*G06F 3/041* (2006.01)
*G06F 3/0488* (2013.01)
*G06F 3/038* (2013.01)
(52) U.S. Cl.
CPC ............ *G06F 3/0416* (2013.01); *G06F 3/038* (2013.01); *G06F 3/0488* (2013.01)

(58) Field of Classification Search
CPC ....... G06F 3/0416; G06F 3/038; G06F 3/0488
See application file for complete search history.

(56) References Cited

U.S. PATENT DOCUMENTS

| | | | |
|---|---|---|---|
| 8,686,962 B2* | 4/2014 | Christie | G06F 3/044 345/173 |
| 2013/0076649 A1* | 3/2013 | Myers | H04M 1/0268 345/173 |

FOREIGN PATENT DOCUMENTS

| | | |
|---|---|---|
| TW | 201319915 A1 | 5/2013 |
| TW | 201426446 A | 7/2014 |

* cited by examiner

*Primary Examiner* — Andrew Sasinowski
(74) *Attorney, Agent, or Firm* — ScienBiziP, P.C.

(57) ABSTRACT

A method for controlling input in a mobile terminal can first set multiple operation modes for the mobile terminal and set multiple relation lists each of which defines a relationship between multiple predetermined functions to be executed in a corresponding operation mode and information regarding multiple predetermined touch operations input in the corresponding operation mode, and switches the operation mode of the mobile terminal among multiple operation modes, and controls the mobile terminal to execute multiple predetermined functions associated with multiple predetermined touch operations applied to a touch screen of the mobile terminal.

15 Claims, 3 Drawing Sheets

MOBILE TERMINAL AND METHOD FOR INPUT CONTROL

CROSS-REFERENCE TO RELATED APPLICATIONS

This application claims priority to Taiwanese Patent Application No. 103146682 filed on Dec. 31, 2014, the contents of which are incorporated by reference herein.

FIELD

The subject matter herein generally relates to input control, and particularly to a mobile terminal and a method for input control.

BACKGROUND

Mouse control functions and touch control functions are widely used in electronic devices. However, existing mobile terminals are usually equipped with touch control functions, but fail to be equipped with both control functions.

BRIEF DESCRIPTION OF THE DRAWINGS

Implementations of the present disclosure will now be described, by way of example only, with reference to the attached figures.

DETAILED DESCRIPTION

Figure 1:
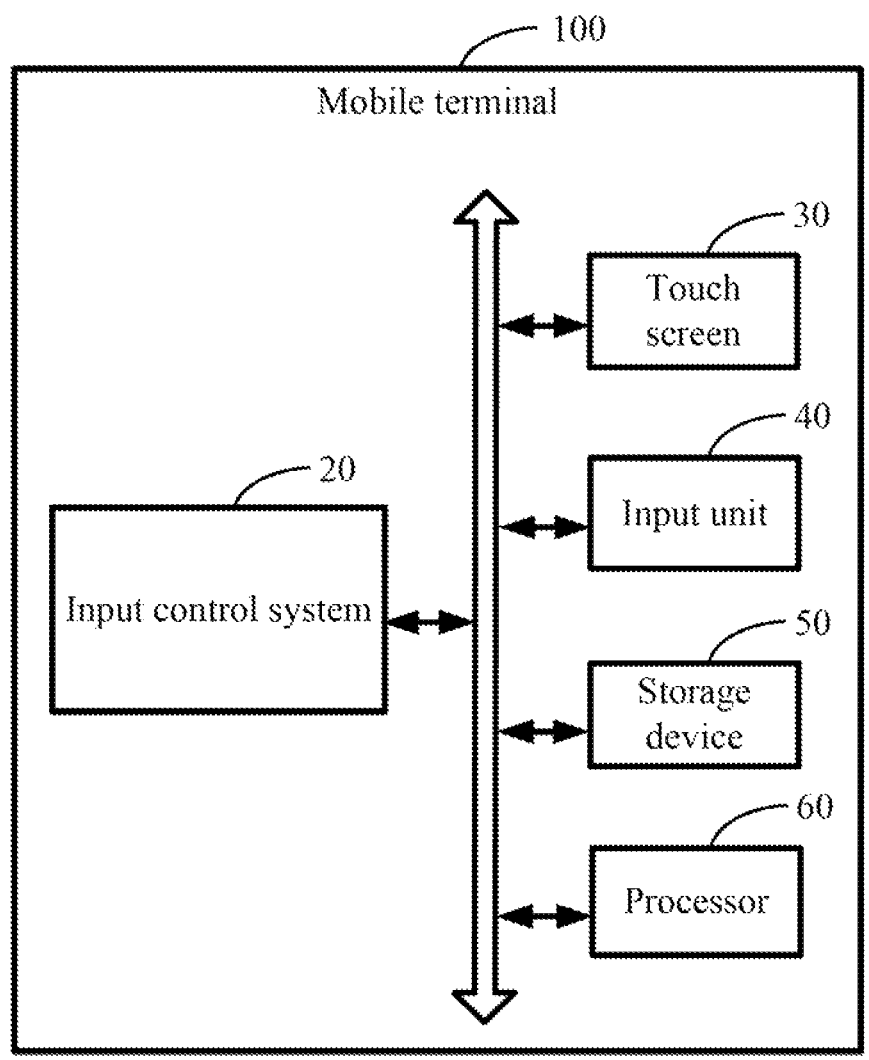
FIG. 1 is a block diagram of one embodiment of a mobile terminal including an input control system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the term "comprising" means "including, but not necessarily limited to"; it specifically indicates open-ended inclusion or membership in a so-described combination, group, series and the like. The term "module" refers to logic embodied in hardware or firmware, or to a collection of software instructions, written in a programming language, such as, Java, C, or assembly. One or more software instructions in the modules can be embedded in firmware, such as in an erasable programmable read only memory (EPROM). The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

FIG. 1 is a block diagram of one embodiment of a mobile terminal. In at least one embodiment as shown in FIG. 1, a mobile terminal 100 includes, but is not limited to an input control system 20, a touch screen 30, an input unit 40, a storage device 50, and at least one processor 60. The input control system 20 is coupled to the touch screen 30, the input unit 40, the storage device 50, and the at least one processor 60. FIG. 1 illustrates only one example of the mobile terminal 100, other examples can comprise more or fewer components than illustrated, or have a different configuration of the various components.

In one embodiment, the mobile terminal 100 can be mobile phones, tablet computers, or any other suitable portable mobile terminals. The touch screen 30 can receive touch operations. The input unit 40 is configured to generate an operation mode switching signal in response to operations applied to the input unit 40. In the embodiment, the input unit 40 can be a physical button (not shown) located on a shell (not shown) of the mobile terminal 100, or be an icon (not shown) displayed on the touch screen 30.

The storage device 50 can be an internal storage device, such as a flash memory, a random access memory (RAM) for temporary storage of information, and/or a read-only memory (ROM) for permanent storage of information. The storage device 50 can also be an external storage device, such as an external hard disk, a storage card, or a data storage medium. The at least one processor 60 can be a central processing unit (CPU), a microprocessor, or other data processor chip that performs functions of the mobile terminal 100.

In one embodiment, the input control system 20 can set multiple operation modes for the mobile terminal 100 and set multiple relation lists each defining a relationship between multiple predetermined functions to be executed in a corresponding operation mode and information regarding multiple predetermined touch operations input in the corresponding operation mode, switch the operation mode of the mobile terminal 100 among multiple operation modes, and control the mobile terminal 100 to execute multiple predetermined functions associated with multiple predetermined touch operations applied to the touch screen 30 of the mobile terminal 100.

Figure 2:
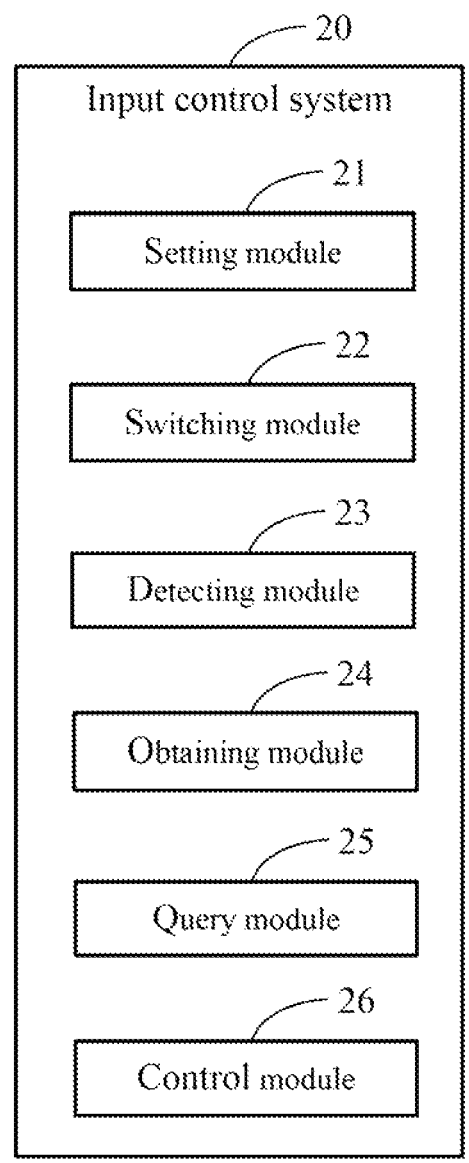
FIG. 2 is a block diagram of one embodiment of function modules of the input control system in the mobile terminal of FIG. 1.

FIG. 2 shows that in at least one embodiment, the input control system 20 can include a setting module 21, a switching module 22, a detecting module 23, an obtaining module 24, a query module 25, and a control module 26. Modules 21-26 can comprise computerized instructions in the form of one or more computer-readable programs that can be stored in a non-transitory computer-readable medium, for example in the storage device 50, and are executed by the at least one processor 60 of the mobile terminal 100 to provide functions of the present disclosure. A detailed description of the functions of the modules 21-26 is given below in reference to FIG. 1.

In the embodiment, the setting module 21 sets multiple operation modes for the mobile terminal 100 and sets multiple relation lists. In the embodiment, each relation list corresponds to an operation mode and defines a relationship between multiple predetermined functions to be executed in a corresponding operation mode and information regarding multiple predetermined touch operations input in the corresponding operation mode.

In the embodiment, the storage device 50 of the mobile terminal 100 stores the multiple operation modes of the mobile terminal 100 and the relation lists corresponding to the multiple operation modes.

In the embodiment, the obtaining module 24 obtains the operation mode switching signal generated by the input unit 40 of the mobile terminal 100, and the switching module 22 switches the operation mode of the mobile terminal among the multiple operation modes in response to the operation mode switching signal.

The detecting module 23 detects a touch operation applied to the touch screen 30, and the obtaining module 24 obtains information regarding the detected touch operation and a current operation mode of the mobile terminal 100.

The query module 25 queries the relation list corresponding to the current operation mode to determine a target function associated with the detected touch operation.

In the embodiment, the query module 25 at first queries the relation list corresponding to the current operation mode to determine that the obtained information regarding the detected touch operation matches information regarding one of the multiple predetermined touch operations input in the current operation mode. Upon such determination, the query module 25 determines a target function associated with the obtained information regarding the detected touch operation.

In the embodiment, the multiple operation modes include a touch control mode and a mouse control mode.

In one embodiment, the multiple predetermined touch operations input in the touch control mode include, but are not limited to a single-touch operation, a multi-touch operation, a long touch operation, a sliding touch operation, and a dragging touch operation.

In the embodiment, the multiple predetermined functions to be executed in the touch control mode include, but are not limited to functions associated with a single-touch operation, functions associated with a multi-touch operation, functions associated with a long touch operation, functions associated with a sliding touch operation, and functions associated with a dragging touch operation.

In one embodiment, the multiple predetermined touch operations input in the mouse control mode include, but are not limited to a click touch operation corresponding to a mouse left or right click operation, a double-click touch operation corresponding to a mouse left double-click operation, a sliding touch operation corresponding to a mouse rolling operation, and a dragging touch operation corresponding to a mouse dragging operation.

In one embodiment, the mouse control mode further includes a mouse left control mode and a mouse right control mode.

In one embodiment, the multiple predetermined functions to be executed in the mouse left control mode include, but are not limited to functions associated with a mouse left click operation, functions associated with a mouse left double-click operation, functions associated with a mouse rolling operation, and functions associated with a mouse dragging operation.

In one embodiment, the multiple predetermined functions to be executed in the mouse right control mode include, but are not limited to functions associated with a mouse right click operation.

The control module 26 executes the target function.

With such a configuration, the mobile terminal can be equipped with both the touch control function and the mouse control function.

Figure 3:
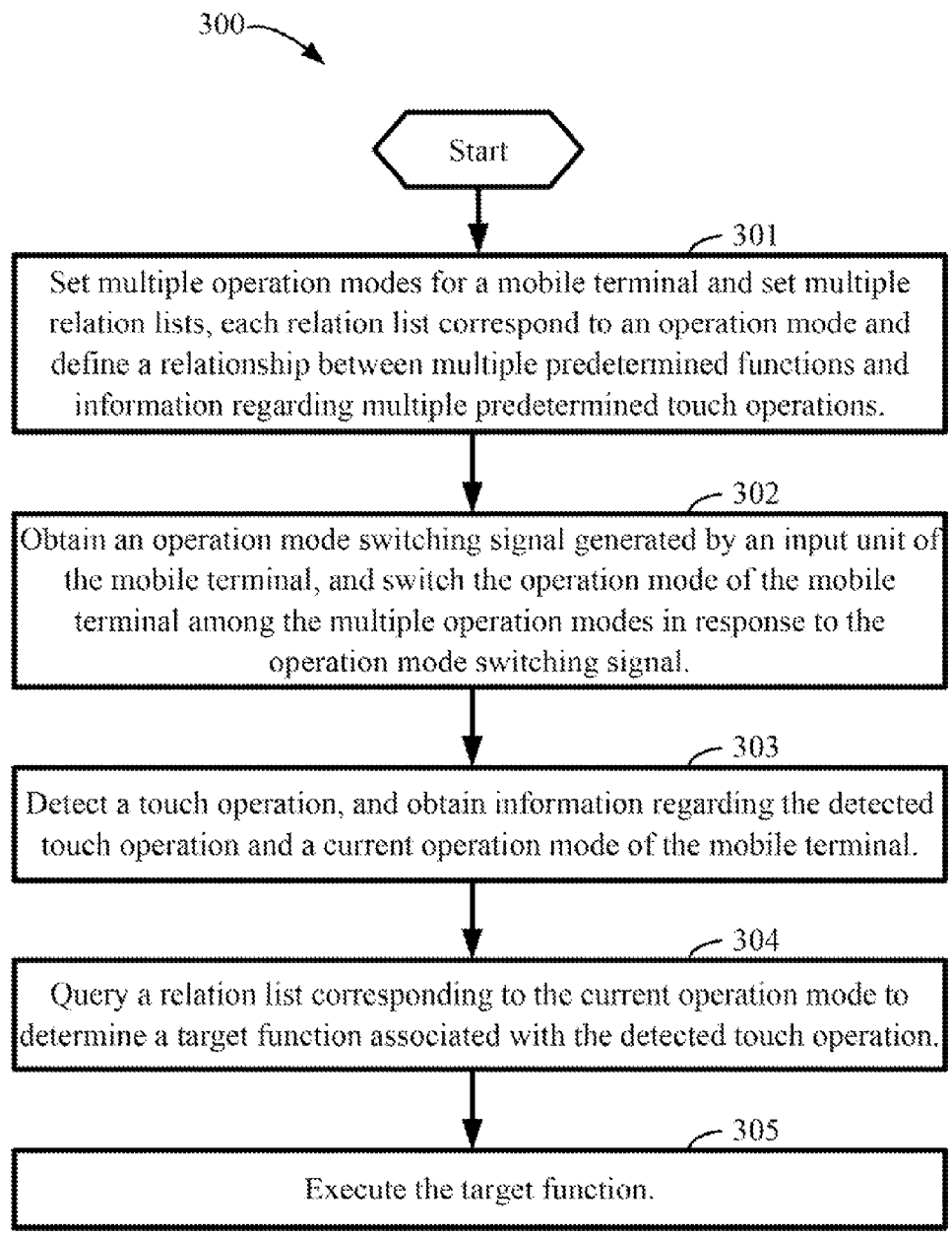
FIG. 3 is a flowchart of one embodiment of a method for controlling input in the mobile terminal of FIG. 1.

FIG. 3 illustrates a flowchart of an example embodiment of a method for controlling input in a mobile terminal. In an example embodiment, the method 300 is performed by execution of computer-readable software program codes or instructions by at least one processor of the mobile terminal.

Referring to FIG. 3, the flowchart is presented in accordance with an example embodiment which is thus illustrated. The example method 300 is provided by way of example, as there are a variety of ways to carry out the method. The method 300 described below can be carried out using the configurations illustrated in FIGS. 1 and 2, for example, and various elements of these figures are referenced in explaining method 300. Each block shown in FIG. 3 represents one or more processes, methods, or subroutines, carried out in the exemplary method 300. Furthermore, the illustrated order of blocks is by example only and the order of the blocks can change. Additional blocks can be added or fewer blocks can be utilized without departing from this disclosure. The example method 300 can begin at block 301.

At block 301, a setting module sets multiple operation modes for the mobile terminal and sets multiple relation lists. In the embodiment, each relation list corresponds to an operation mode and defines a relationship between multiple predetermined functions to be executed in a corresponding operation mode and information regarding multiple predetermined touch operations input in the corresponding operation mode.

In the embodiment, a storage device of the mobile terminal stores the multiple operation modes of the mobile terminal and the relation lists corresponding to the multiple operation modes.

At block 302, an obtaining module obtains an operation mode switching signal generated by an input unit of the mobile terminal, and a switching module switches the operation mode of the mobile terminal among the multiple operation modes in response to the operation mode switching signal.

At block 303, a detecting module detects a touch operation applied to a touch screen of the mobile terminal, and the obtaining module obtains information regarding the detected touch operation and a current operation mode of the mobile terminal.

At block 304, a query module queries the relation list corresponding to the current operation mode to determine a target function associated with the detected touch operation.

In the embodiment, the query module at first queries the relation list corresponding to the current operation mode to determine that the obtained information regarding the detected touch operation matches information regarding one of the multiple predetermined touch operations input in the current operation mode. Upon such determination, the query module determines a target function associated with the obtained information regarding the detected touch operation.

In the embodiment, the multiple operation modes include a touch control mode and a mouse control mode.

In one embodiment, the multiple predetermined touch operations input in the touch control mode include, but are not limited to a single-touch operation, a multi-touch operation, a long touch operation, a sliding touch operation, and a dragging touch operation.

In the embodiment, the multiple predetermined functions to be executed in the touch control mode include, but are not limited to functions associated with a single-touch operation, functions associated with a multi-touch operation, functions associated with a long touch operation, functions associated with a sliding touch operation, and functions associated with a dragging touch operation.

In one embodiment, the multiple predetermined touch operations input in the mouse control mode include, but are not limited to a click touch operation corresponding to a mouse left or right click operation, a double-click touch operation corresponding to a mouse left double-click operation, a sliding touch operation corresponding to a mouse rolling operation, and a dragging touch operation corresponding to a mouse dragging operation.

In one embodiment, the mouse control mode further includes a mouse left control mode and a mouse right control mode.

In one embodiment, the multiple predetermined functions to be executed in the mouse left control mode include, but are not limited to functions associated with a mouse left click operation, functions associated with a mouse left double-click operation, functions associated with a mouse rolling operation, and functions associated with a mouse dragging operation.

In one embodiment, the multiple predetermined functions to be executed in the mouse right control mode include, but are not limited to functions associated with a mouse right click operation.

At block 305, a control module executes the target function.

The embodiments shown and described above are only examples. Even though numerous characteristics and advantages of the present technology have been set forth in the foregoing description, together with details of the structure and function of the present disclosure, the disclosure is illustrative only, and changes can be made in the detail, including in particular the matters of shape, size, and arrangement of parts within the principles of the present disclosure, up to and including the full extent established by the broad general meaning of the terms used in the claims.

What is claimed is:

1. A mobile terminal comprising:
 a touch screen;
 at least one processor coupled to the touch screen; and
 a non-transitory storage device coupled to the processor, the storage device storing one or more programs, which upon execution by the processor, cause the processor to:
 set multiple operation modes for the mobile terminal and set multiple relation lists, wherein the multiple operation modes comprise at least a touch control mode and a mouse control mode; the touch control mode is when input operations are input through the touch screen to control functions of the mobile terminal; the mouse control mode is when input operations are input through a mouse to control functions of the mobile terminal; each relation list corresponds to one of the operation modes, and defines a relationship between multiple predetermined functions to be executed in the corresponding operation mode and information regarding multiple predetermined input operations input in the corresponding operation mode;
 obtain an operation mode switching signal generated by an input unit and switch the operation mode of the mobile terminal among the multiple operation modes in response to the operation mode switching signal, wherein the input unit is a physical button located on a shell of the mobile terminal or an icon displayed on the touch screen, the input unit generates the operation mode switching signal in response to operations applied to the input unit;
 detect an input operation applied to the mobile terminal;
 obtain information regarding the detected input operation and a current operation mode of the mobile terminal;
 query the relation list corresponding to the current operation mode to determine that the obtained information regarding the detected input operation matches information regarding one of the multiple predetermined input operations input in the current operation mode;
 upon such determination, determine a target function associated with the obtained information regarding the detected input operation; and
 execute the target function.

2. The mobile terminal as described in claim 1, wherein the multiple predetermined input operations input in the touch control mode comprises a single-touch operation, a multi-touch operation, a long touch operation, a sliding touch operation, and a dragging touch operation.

3. The mobile terminal as described in claim 2, wherein the multiple predetermined functions to be executed in the touch control mode comprise functions associated with a single-touch operation, functions associated with a multi-touch operation, functions associated with a long touch operation, functions associated with a sliding touch operation, and functions associated with a dragging touch operation.

4. The mobile terminal as described in claim 1, wherein the multiple predetermined input operations input in the mouse control mode comprises a click touch operation corresponding to a mouse left or right click operation, a double-click touch operation corresponding to a mouse left double-click operation, a sliding touch operation corresponding to a mouse rolling operation, and a dragging touch operation corresponding to a mouse dragging operation.

5. The mobile terminal as described in claim 4, wherein the mouse control mode further comprises a mouse left control mode and a mouse right control mode, the multiple predetermined functions to be executed in the mouse left control mode comprise functions associated with a mouse left click operation, functions associated with a mouse left double-click operation, functions associated with a mouse rolling operation, and functions associated with a mouse dragging operation, and the multiple predetermined functions to be executed in the mouse right control mode comprise functions associated with a mouse right click operation.

6. A computer-implemented method for controlling input in a mobile terminal being executed by a processor of the mobile terminal, the method comprising:
 setting multiple operation modes for the mobile terminal and setting multiple relation lists, wherein the multiple operation modes comprise at least a touch control mode and a mouse control mode; the touch control mode is when input operations are input through the touch screen to control functions of the mobile terminal; the mouse control mode is when input operations are input through a mouse to control functions of the mobile terminal; each relation list corresponds to one of the operation modes, and defines a relationship between multiple predetermined functions to be executed in the corresponding operation mode and information regarding multiple predetermined input operations input in the corresponding operation mode;

obtain an operation mode switching signal generated by an input unit and switch the operation mode of the mobile terminal among the multiple operation modes in response to the operation mode switching signal, wherein the input unit is a physical button located on a shell of the mobile terminal or an icon displayed on the touch screen, the input unit generates the operation mode switching signal in response to operations applied to the input unit;

detecting an input operation applied to the mobile terminal;

obtaining information regarding the detected input operation and a current operation mode of the mobile terminal;

querying the relation list corresponding to the current operation mode to determine that the obtained information regarding the detected input operation matches information regarding one of the multiple predetermined input operations input in the current operation mode;

upon such determination, determining a target function associated with the obtained information regarding the detected input operation; and executing the target function.

7. The method as described in claim 6, wherein the multiple predetermined input operations input in the touch control mode comprises a single-touch operation, a multi-touch operation, a long touch operation, a sliding touch operation, and a dragging touch operation.

8. The method as described in claim 7, wherein the multiple predetermined functions to be executed in the touch control mode comprise functions corresponding to a single-touch operation, functions associated with a multi-touch operation, functions associated with a long touch operation, functions associated with a sliding touch operation, and functions associated with a dragging touch operation.

9. The method as described in claim 6, wherein the multiple operation modes comprise a mouse control mode, the multiple predetermined touch operations input in the mouse control mode comprises a click touch operation corresponding to a mouse left or right click operation, a double-click touch operation corresponding to a mouse left double-click operation, a sliding touch operation corresponding to a mouse rolling operation, and a dragging touch operation corresponding to a mouse dragging operation.

10. The method as described in claim 9, wherein the mouse control mode further comprises a mouse left control mode and a mouse right control mode, the multiple predetermined functions to be executed in the mouse left control mode comprise functions associated with a mouse left click operation, functions associated with a mouse left double-click operation, functions associated with a mouse rolling operation, and functions associated with a mouse dragging operation, and the multiple predetermined functions to be executed in the mouse right control mode comprise functions associated with a mouse right click operation.

11. A non-transitory storage medium having stored thereon instructions that, when executed by at least one processor of a mobile terminal, causing the at least one processor to perform a method for controlling input in the mobile terminal, the method comprising:

setting multiple operation modes for the mobile terminal and setting multiple relation lists, wherein the multiple operation modes comprise at least a touch control mode and a mouse control mode; the touch control mode is when input operations are input through the touch screen to control functions of the mobile terminal; the mouse control mode is when input operations are input through a mouse to control functions of the mobile terminal; each relation list corresponds to one of the operation modes, and defines a relationship between multiple predetermined functions to be executed in the corresponding operation mode and information regarding multiple predetermined input operations input in the corresponding operation mode;

obtain an operation mode switching signal generated by an input unit and switch the operation mode of the mobile terminal among the multiple operation modes in response to the operation mode switching signal, wherein the input unit is a physical button located on a shell of the mobile terminal or an icon displayed on the touch screen, the input unit generates the operation mode switching signal in response to operations applied to the input unit;

detecting an input operation applied to the mobile terminal;

obtaining information regarding the detected input operation and a current operation mode of the mobile terminal;

querying the relation list corresponding to the current operation mode to determine that the obtained information regarding the detected input operation matches information regarding one of the multiple predetermined input operations input in the current operation mode;

upon such determination, determining a target function associated with the obtained information regarding the detected input operation; and executing the target function.

12. The non-transitory storage medium as described in claim 11, wherein the multiple predetermined input operations input in the touch control mode comprises a single-touch operation, a multi-touch operation, a long touch operation, a sliding touch operation, and a dragging touch operation.

13. The non-transitory storage medium as described in claim 12, wherein the multiple predetermined functions to be executed in the touch control mode comprise functions corresponding to a single-touch operation, functions associated with a multi-touch operation, functions associated with a long touch operation, functions associated with a sliding touch operation, and functions associated with a dragging touch operation.

14. The non-transitory storage medium as described in claim 11, wherein the multiple predetermined input operations input in the mouse control mode comprises a click touch operation corresponding to a mouse left or right click operation, a double-click touch operation corresponding to a mouse left double-click operation, a sliding touch operation corresponding to a mouse rolling operation, and a dragging touch operation corresponding to a mouse dragging operation.

15. The non-transitory storage medium as described in claim 14, wherein the mouse control mode further comprises a mouse left control mode and a mouse right control mode, the multiple predetermined functions to be executed in the mouse left control mode comprise functions associated with a mouse left click operation, functions associated with a mouse left double-click operation, functions associated with a mouse rolling operation, and functions associated with a mouse dragging operation, and the multiple predetermined functions to be executed in the mouse right control mode comprise functions associated with a mouse right click operation.

* * * * *